United States Patent [19]

Gallagher et al.

[11] Patent Number: 5,414,428
[45] Date of Patent: May 9, 1995

[54] RADAR SYSTEM WITH PULSE COMPRESSION AND RANGE SIDELOBE SUPPRESSION PRECEDING DOPPLER FILTERING

[75] Inventors: John J. Gallagher, Turnersville, N.J.; Harry Urkowitz, Philadelphia, Pa.

[73] Assignee: Martin Marietta Corp., Moorestown, N.J.

[21] Appl. No.: 239,051

[22] Filed: May 6, 1994

Related U.S. Application Data

[63] Continuation-in-part of Ser. No. 103,027, Aug. 6, 1993.

[51] Int. Cl.⁶ .................................... G01S 13/28
[52] U.S. Cl. ............................ 342/132; 342/111; 342/192; 342/196
[58] Field of Search ........... 342/134, 116, 145, 99, 342/132, 135, 140, 159, 162, 111, 21, 196, 195, 192, 194

[56] References Cited

U.S. PATENT DOCUMENTS

| | | | |
|---|---|---|---|
| 5,103,233 | 4/1992 | Gallagher et al. | 342/408 |
| 5,115,243 | 5/1992 | Perry et al. | 342/158 |
| 5,115,244 | 5/1992 | Freedman et al. | 342/158 |
| 5,128,683 | 7/1992 | Freedman et al. | 342/158 |
| 5,151,702 | 9/1992 | Urkowitz | 342/134 |
| 5,157,403 | 10/1992 | Urkowitz | 342/111 |
| 5,173,706 | 12/1992 | Urkowitz | 342/99 |
| 5,229,775 | 7/1993 | Sakamoto et al. | 342/196 X |
| 5,245,347 | 9/1993 | Bonta et al. | 342/196 X |
| 5,309,161 | 5/1994 | Urkowitz et al. | 342/132 |

*Primary Examiner*—John B. Sotomayor
*Attorney, Agent, or Firm*—W. H. Meise; C. A. Nieves; S. A. Young

[57] ABSTRACT

A radar system transmits dispersed pulses, and receives echoes from targets. The echo signals are digitized and applied over a number of signal paths. In each signal path except one, the digitized signal is multiplied by one of a plurality of differential exponential signals, for converting the echo signal of different exponential signals, for converting the echo signal in each path to baseband, with the baseband frequency representing a particular Doppler which depends upon the exponential signal. In the one remaining signal path, no multiplier is used, and the echo signal is deemed to be at baseband. The signals in each path are applied through a cascade of a pulse compressor and a range sidelobe suppressor. Since Doppler filtering has not yet taken place, full compression and range sidelobe reduction is not achieved, because of extraneous pulse-to-pulse phase shifts. The signals in each signal path are applied to a filter element of a pulse-to-pulse Doppler filter bank, which removes the extraneous phase shifts, and thereby provides full suppression of the range sidelobes.

7 Claims, 5 Drawing Sheets

RADAR SYSTEM WITH PULSE COMPRESSION AND RANGE SIDELOBE SUPPRESSION PRECEDING DOPPLER FILTERING

This is a continuation-in-part of application Ser. No. 08/103,027, filed Aug. 6, 1993 now allowed, in the names of Gallagher and Urkowitz.

FIELD OF THE INVENTION

This invention relates to radar systems generally, and more specifically to arrangements for reducing range sidelobes in radar systems which transmit dispersed waveforms, and using matched filtering for pulse compression of the waveforms, and sidelobe suppression of the compressed waveforms, followed by Doppler processing of received echoes.

BACKGROUND OF THE INVENTION

The high speed and long range of modern airborne vehicles places increasing range demands on radar systems used for tracking. The long-range requirement also requires the use of relatively high transmitted power to reliably detect small targets. High transmitted power implies a relatively higher peak transmitter power or a longer duration transmitter pulse (also known as a "wider" pulse). Assuming a maximum available peak power, longer range implies a longer duration transmitted pulse. A longer duration pulse tends to reduce range resolution, which is the ability to distinguish among targets which are at similar ranges. Pulse compression techniques can be used to improve range resolution in spite of the longer pulse duration, thus eliminating the need for high peak power short pulses, but the minimum range at which a target can be detected by a monostatic radar system increases with the transmitted pulse length. Thus, if the transmitter pulse duration is 100 microseconds ($\mu$s), the minimum distance at which a target may be detected by a monostatic radar is about 8 nautical miles (nm). Clearly, a radar using pulses of such a duration cannot be used to detect close-in targets, as for example aircraft which are landing or taking off from an airport at which the radar is situated. An additional problem associated with pulse compression is the appearance of range sidelobes (as distinguished from antenna sidelobes) in addition to the main range lobe. The time position, or range, of the main lobe is the position that is tested for the presence of a target and for estimating the parameters of that target (reflected energy or power, fluctuations in echo power, and closing speed, etc.). The presence of range sidelobes on the compressed pulse results in interfering echoes which originate at ranges other than the range of the main lobe. This interference, known as "flooding," can cause erroneous estimates of the echo characteristics in the range cell (i.e., range increment) covered by the main lobe. Prior art techniques for suppressing range sidelobes include the "zero-Doppler" technique, in which the range sidelobe suppression scheme is based in part upon the assumption that the interfering echoes, as well as the desired echo, are associated with a closing velocity which results in no significant Doppler phase change or shift over the duration of the uncompressed pulse. The Doppler phase shift $\phi_{DV}$ across the uncompressed pulse is $2\pi$ times the product of the Doppler frequency shift and the uncompressed pulse duration (i.e. $\phi_{DV}=2\pi\ f_d T_0$ radians). When this Doppler phase shift is actually zero or very small, moderate sidelobe suppression is achievable with the zero Doppler design. However, the zero Doppler design is very sensitive to small Doppler frequency shifts, making deep sidelobe suppression impossible for radar applications in which such deep sidelobe suppression is desired, as for example in weather mapping, clear air turbulence detection, and microburst detection.

An approach to range sidelobe suppression elimination is described as prior art in U.S. Pat. No. 5,151,702, issued Sep. 29, 1992, in the name of Urkowitz (Urkowitz '702), incorporated herein by reference. FIG. 1 is a simplified block diagram of prior art as described in Urkowitz '702. In FIG. 1, a complex received signal I+jQ is applied by way of an input port 10 to a pulse compressor, illustrated as a block 12, for enhancing signal-to-noise ratio. The compressed signal is applied to a range sidelobe suppressor 14, which may be implemented as a mismatch filter for reducing range sidelobes which result from pulse compression. The pulse compressed, range sidelobe suppressed, echo signal is applied to a pulse-to-pulse Doppler filter bank 16, which separates the received signals from sequential receptions into frequency bins, as well known in the art. The Doppler filtered signals from Doppler filter bank 16 are independently applied to amplitude detectors 218a, 218b, 218c, . . . , 218m, for generating the desired radial velocity information of both point and diffuse targets, which may then be applied for further processing and display. The further processing may include, as indicated in FIG. 1, threshold processing for determining the presence of a target in noise and clutter. This prior art arrangement for suppressing sidelobes includes the "zero Doppler" technique, in which the assumption is made that the interfering echoes as well as the desired echo have a closing velocity that has no significant Doppler phase change or shift over the duration of the uncompressed pulse, as described in detail in U.S. Pat. No. 5,173,706, issued Dec. 22, 1992 in the name of Urkowitz (Urkowitz '706), incorporated herein by reference. As mentioned, when the Doppler phase shift is actually zero or very small, moderate sidelobe suppression is achievable with the zero Doppler design, but the design is very sensitive to small Doppler frequency shifts, thereby making deep sidelobe suppressio impossible in the presence of such shifts.

The solution to the abovementioned problems as described in Urkowitz '706 is illustrated generally in FIG. 2. FIG. 2 is a simplified block diagram of an embodiment of the invention which is better suited to larger Doppler frequency shifts and/or larger duration-bandwidth products than the structure of FIG. 1. In FIG. 2, the I+jQ signal, representing the complex envelope of the radar echo, plus whatever receiver noise is combined with the echo, is applied by way of port 210 to Doppler filter bank 216, without being pulse-compressed. Filter bank 216 separates the signal into frequency bins, and applies the signal in each bin to a separate processor 228, which performs the functions of both pulse compression and range sidelobe suppression (PC & SS). As with the arrangement of FIG. 1, the output from the lowest-frequency bin of Doppler filter bank 216, namely the $f_1$ bin, is applied directly to its associated processor 228a, without a multiplication or frequency conversion. The output signals from filter elements $f_2$ though $f_m$ of Doppler filter bank 216 are individually applied to a corresponding multiplier 220. For example, the output port of filter element $f_3$ of filter bank 216 is applied to an input of a multiplier 220c.

Multiplier 220c also receives from a source (not illustrated in FIG. 2) an oscillation signal $\exp(-j2\pi f_3 k \tau_0)$ which is the negative of the center frequency of filter element $f_3$. This has the effect of converting the signal output of filter element $f_3$ to baseband. The output signals of each of the other filter elements of filter bank 216 (except filter element $f_1$) are similarly processed, with the result that all the filter element output signals are converted to baseband signals with a bandwidth corresponding to that of the filter element. The bandwidth of each filter element of filter bank 216 is small, on the order of a few Hertz or less.

As described in the Urkowitz '706 patent, the pulse compression and range sidelobe suppression performed in processor 228 of FIG. 2 may be performed by a pair of FIR filters implemented as tapped delay lines with weighting and summing. The salient requirement is that the range sidelobe reduction function be provided individually for the signal component in each frequency bin. When this requirement is met, the range sidelobe suppression can be optimized for each frequency increment, and the suppression can be maintained. The combination 228 of pulse compressor and range sidelobe suppression follows each of the complex multipliers 220. Since each complex multiplication removes the residual Doppler phase shift across the uncompressed pulse, no residual Doppler phase shift remains on the uncompressed pulse. Each pulse compressor and range sidelobe suppressor is a zero Doppler design. All of the pulse compressor and range sidelobe suppressors are therefore identical, which is a cost advantage.

It was believed that the pulse-to-pulse Doppler filter bank, range mixers, pulse compressors, and sidelobe suppressors constituted a combination of time-invariant and time-variant filters, in which the order of processing is critical.

SUMMARY OF THE INVENTION

The inventor herein realized that the time-varying component varies with time in an intra-pulse manner, whereas the inter-pulse or per-pulse operation could be considered to be mathematically, and therefore physically, independent. A Doppler radar system according to the invention includes a transmitter for transmitting a plurality of sets of dispersed pulses of electromagnetic radiation toward scatterers, which results in the generation of returns or echoes. A receiver is coupled for receiving the returns from the scatterers, and for generating sets of received complex envelope signals therefrom. A bank of pulse-to-pulse Doppler filters is provided, each of which includes a second plurality of inputs and the same second plurality of outputs, for filtering signals applied to each of the inputs about the center frequency of one of a plurality of frequency bins, to thereby produce a plurality of signals, each having a frequency spectrum related to that of the associated bin. The radar system further includes a plurality, equal to the second plurality, of complex exponential signal generators, each of which generates a complex exponential signal, the frequency of which is centered at the negative of the frequency of an associated one of the frequency bins of the pulse-to-pulse Doppler filters, and a plurality, equal to the second plurality, of multipliers, each of which is coupled to the receiver and to one of the complex exponential signal generators. Each of the multipliers multiplies the sets of received complex envelope signals by one of the complex exponential waveforms, to thereby convert the sets of received signals into a baseband signal component at the output of each multiplier, whereby the plurality of multipliers produces a plurality of baseband signal components. The radar system further includes a plurality, equal in number to the second plurality, of identical cascades. Each of the cascades includes the cascade of a range sidelobe suppressor and a pulse compressor, and each of the cascades is coupled to the output of one of the multipliers and to the input of a corresponding one of the pulse-to-pulse Doppler filters of the Doppler filter bank. Each of the cascades processes one of the baseband signal components to reduce range sidelobes, to thereby produce a plurality of range sidelobe suppressed signals at the inputs of the pulse-to-pulse Doppler filters, whereby each set of transmitted and received signals results in a set of signals at the outputs of the Doppler filter bank.

DESCRIPTION OF THE INVENTION

Figure 3:
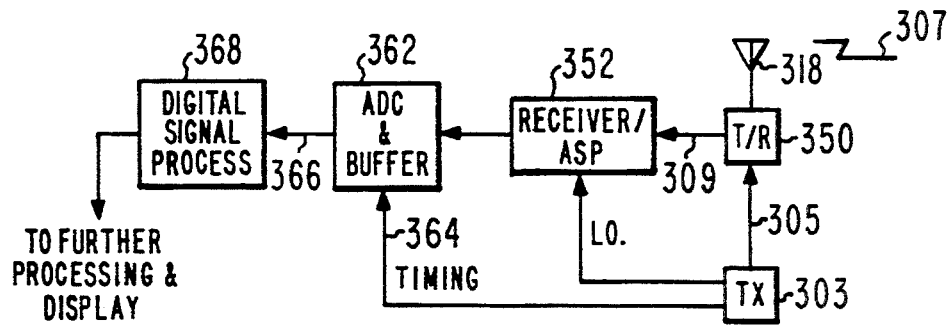
FIG. 3 is a simplified block diagram of a radar system.

FIG. 3 is a simplified block diagram of a radar system as described in the abovementioned Urkowitz '702 patent. In FIG. 3, an antenna 318 is connected by way of a transmit-receive (T/R) duplexing or multiplexing system 350 to a transmit controller (TX) 303. Controller 303 establishes the system pulse duration, PRF, frequency and the like, and provides other control functions including generation of local oscillator and tuning signals. Antenna 318, controller 303 and T/R 350 together cause transmission of electromagnetic signals, illustrated as 307, and couple echoes of the electromagnetic signals received by antenna 318 by way of a path 309 to a receiver and analog signal processor (ASP) 352 for low-noise amplification, frequency downconversion, and the like, with the aid of local oscillator (L.O.) signals. In their broadest concept, there are conventional radar techniques. The resulting baseband signals may, in general, include orthogonal inphase (I) and quadrature (Q) components. The baseband signals are applied from receiver/ASP 352 to an analog-to-digital converter (ADC) associated with a block 362, which converts the analog baseband signals to digital form with the aid of system timing signals applied over a path 364. The "range clock" portion of the timing signals establishes the smallest time interval into which the received signals are quantized, and therefore establishes the smallest discernible target range increment.

As described in the abovementioned Urkowitz '702 patent, a buffer may be associated with ADC 362 of FIG. 3 for purposes unrelated to the present application. The digital signals are coupled from ADC 362 (or its buffers, if used) to a digital signal processor (DSP) 368, for performing processing, including the processing described in conjunction with FIG. 4.

Figure 4:
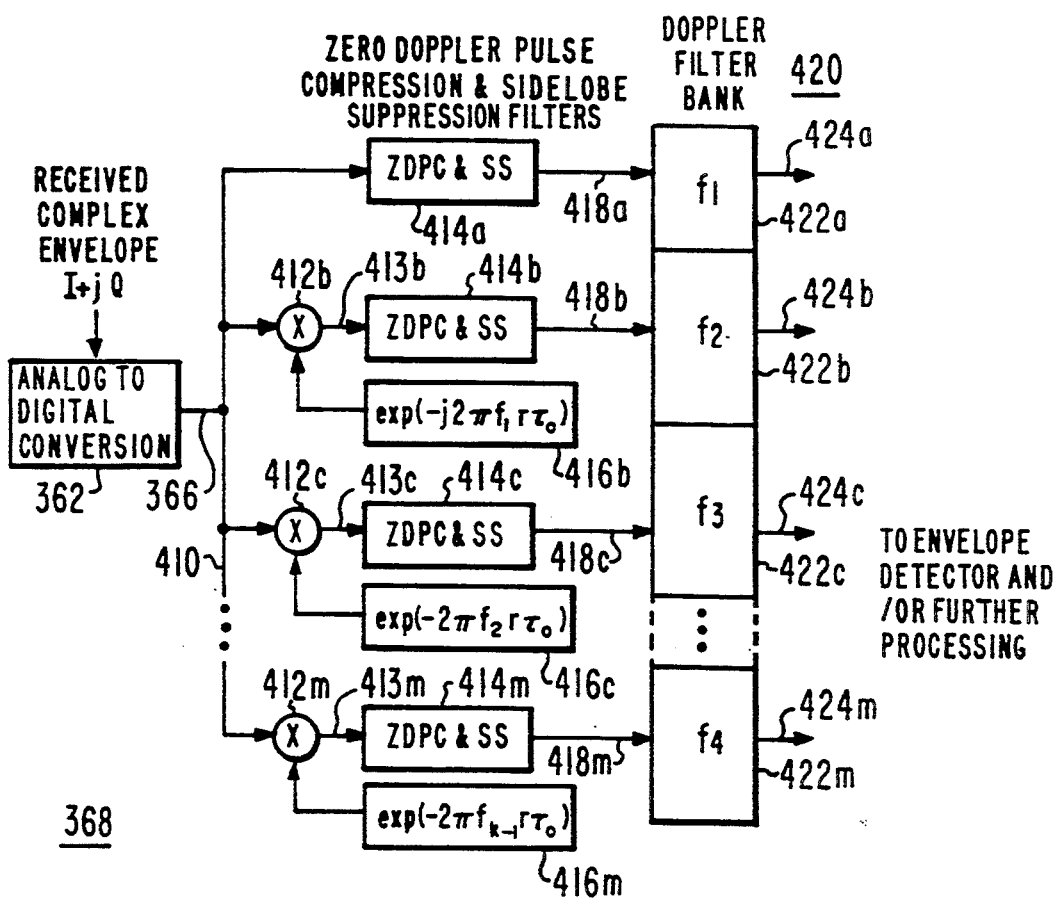
FIG. 4 is a simplified block diagram illustrating an embodiment of the invention, which may be used in the radar system of FIG. 1.

In FIG. 4, a digitized received complex envelope signal is applied from analog-to-digital converter 362, in common, over signal paths 366 and 410 to inputs of a set of complex multipliers 412b, 412c . . . , 412m. The digitized received complex envelope signal is also applied directly from path 410 to a zero Doppler pulse compressor and sidelobe suppression filter (ZDPC & SS), illustrated together as a block 414a, for reasons described below. Each complex multiplier 412b, 412c, . . . , 412m also receives a complex exponential signal exp $(-j2\pi f_n r \tau_o)$ from a corresponding source 416b, 416c, . . . , 416m. For example, ZDPC & SS 414b receives a complex exponential signal exp $(-j2\pi f_1 r \tau_o)$ from a complex exponential signal source 416b, ZDPC & SS 414c receives a complex exponential signal exp $(-j2\pi f_2 r \tau_o)$ from a complex exponential signal source 414c, . . . , and ZDPC & SS 414m receives a complex exponential signal exp $(-j2\pi f_m r \tau_o)$ from a complex exponential signal source 416m. The complex exponential signal has a line spectrum, and may be considered to be the output of an oscillator. The multiplied signal at the output port of each multiplier 412b, 412c, . . . , 412m is applied over a corresponding signal path 413b, 413c, . . . 413m to a zero Doppler pulse compressor and sidelobe suppression filter (ZDPC & SS), illustrated as blocks 414b, 414c, . . . , 414m. The outputs of blocks 414b, 414c, . . . , 414m are applied to inputs of pulse-to-pulse Doppler filters 422b, 422c, . . . , 422m of a Doppler filter bank 420. The outputs of the Doppler filters are applied over paths 424a, 424b, . . . , 424m to further processing and for eventual display.

In operation of the arrangement of FIGS. 3 and 4, sets of pulses are transmitted toward a target, which may be a diffuse target, and are reflected thereby, to form echo signals. The echo signals are received, to thereby produce received complex envelope signals. The received complex envelope signals are converted into digital form in ADC 62, and the resulting digital form of the complex envelope signals are applied over paths 366 and 410 (in parallel form if desired), in common, to the inputs of multipliers 412. The complex exponential signals are selected in conjunction with the frequencies of the pulse-to-pulse Doppler filters 422a, 422b, . . . , 422m, so that each multiplier 412, when it multiplies the digital complex envelope signal at its input port by the complex exponential signal from its associated complex exponential source 416, converts the complex envelope signal to zero frequency reference, which may be considered to be baseband, along each range trace. Thus, the output signal from each multiplier 412 on its output signal path 413 is referenced to zero frequency along each range trace. Each of the Doppler filters 420 of Doppler filter bank 420 operates at the pulse-to-pulse rate of the radar system, rather than at the range clock sample rate, so as to respond to the Doppler frequency of the echo, because of the pulse-to-pulse phase change. In other words, each filter 427 of the Doppler filter bank 420 responds, at a particular range bin, to the pulse-to-pulse phase change induced in the echo by its Doppler frequency shift. It does this for each range bin. The output of each of the pulse-to-pulse Doppler filters 420a, 420b, . . . , 420m on signal paths 424a, 42b, 422c, . . . , 424m represents range compressed, sidelobe suppressed Doppler filtered signals which may be further processed, as by envelope detection, CFAR processing, thresholding, spectral analysis, track processing, and the like, for eventual display.

While the outputs of the pulse compressor and sidelobe suppressor cascades 414 of FIG. 4 have been partially sidelobe suppressed in the form in which they appear on signal paths 418, full sidelobe suppression and pulse compression gain are not achieved until the extraneous pulse-to-pulse Doppler components have been removed. The pulse-to-pulse Doppler filter bank removes these extraneous components, and restores the full sidelobe suppression and pulse compression gain.

As so far described, only the signal paths of FIG. 4 which include multipliers 412 have been described. As mentioned above, the digitized echo signals applied to processor 68 are applied directly to zero doppler pulse compressor and sidelobe suppressor 414a, without conversion to baseband by a multiplier. This is because the signal received by processor 68 includes signal components at the selected baseband frequency, which therefore require no conversion before application to ZDPC & SS 414a in order to be at baseband. Thus, the signal path including ZDPC & SS 414a corresponds conceptually with the paths including ZDPC & SS 414b–414m, where the hyphen represents the word "through", except that frequency conversion is not required and the multiplier is therefore dispensed with.

The design of the range sidelobe suppressors and the pulse compressors of the arrangement according to the invention corresponds to those of the prior art. A proof follows of the ability to interchange the operations of Doppler filtering and the pulse compression and range sidelobe suppressors.

THE TRANSMITTED AND RECEIVED WAVEFORMS

Figure 5:
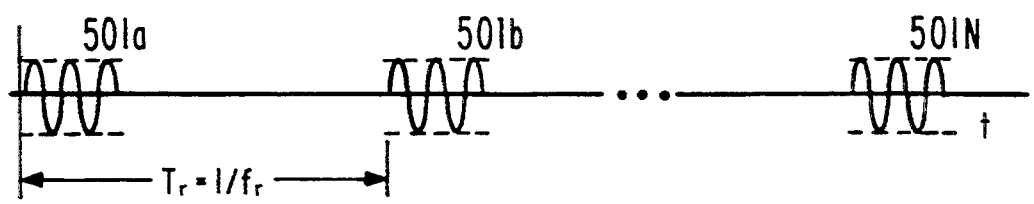
FIG. 5 illustrates a sequence of pulses of a carrier.

Ordinary radar transmission consists of a sequence of carrier pulses, illustrated as 501a, 501b, . . . , 501N in FIG. 5, in which the carrier frequency is $f_c$, and in which the pulses are all similar, occurring at a uniform rate called the "pulse repetition frequency" (PRF). The pulse recurrence or repetition frequency is the inter-verse of the inter-pulse time $T_r$, hence $f_r = 1/T_r$. As illustrated in FIG. 5, pulses 501, 502, 503 have a simple pulse form. Before we go into the mathematics, let's look into the situation qualitatively. We want to add echoes from these pulses and we want to add them in phase so that the sum will be a "coherent" sum. This means that the starting phase of each pulse with respect to its own origin must be the same as that of every other pulse with respect to its origin. The origin for the second pulse is $T_r$; for the third it is $2T_r$, etc. What this means is that, if the carrier frequency is $f_c$, there must effectively be an integer number of cycles in the time interval $T_r$. That is, $$f_c T_r = \text{integer} \qquad (1)$$

In an actual radar system, this is automatically accomplished, within an acceptable error, by using an internal oscillator as the reference for the echoes from each pulse. Whatever the actual phase of the transmission, it is used as the reference phase, and is therefore designated zero phase for each transmitted pulse. This will ensure that Equation (1) is satisfied.

Now we can turn to the algebra. Let $\underline{g}(t)$ denote the pre-envelope of the basic transmitted pulse g(t). Then the sequence of N transmitted pulses may be described in pre-envelope form as $$\underline{s}(t) = \sum_{n=0}^{N-1} \underline{g}(t - nT_r) = \sum_{n=0}^{N-1} \tilde{g}(t - nT_r)e^{j\omega_c(t-nT_r)} \quad (2)$$

where
$\tilde{g}(t)$ is the complex envelope of g(t);
t is time;
n is a running variable;
$T_r$ is defined above;
$\omega_c = 2\pi f_c$; and $$\underline{g}(t) = \tilde{g}(t)e^{j\omega_c t} \quad (3)$$

In view of Equation (1), the exponent in Equation (2) can be written $$e^{j\omega_c t - j\omega_c n T_r} = e^{j\omega_c t} \quad (4)$$

and Equation (2) becomes $$\underline{s}(t) = e^{j\omega_c t} \sum_{n=0}^{N-1} \tilde{g}(t - nT_r) \quad (5)$$

Now let's look at the echo. We presume that the time $NT_r$ is not too large for a moving target to move more than a resolvable range interval. Then each pulse undergoes the same range delay $\tau_i$. Furthermore, let a Doppler frequency $f_d = \omega_d/2\pi$ be imposed upon the echo. The relation between Doppler frequency $f_d$ and range rate $\dot{R}$ is $$f_d = -2\dot{R}f_c/C \quad (6)$$

where $f_c$ is the reference or carrier frequency and c is the speed of light. The echo pre-envelope $g_R(t)$, which has the range delay $\tau_i$ and the Doppler shift $f_d$ imposed on it, may then be found by substituting $t - \tau_i$ for t and $f_c + f_d$ for $f_c$ in Equation (5). This changes the transmitted pre-envelope $\underline{s}(t)$ to the received pre-envelope $g_R(t)$. Thus, $$\underline{g}_R(t) = e^{j\omega_c t} e^{-j\omega_c \tau_i} e^{j\omega_d(t-\tau_i)} \sum_{n=0}^{N-1} \tilde{g}(t - \tau_i - nT_r) \quad (7)$$

We seek the complex envelope $\tilde{g}(t)$, which is simply the coefficient of $\exp(j\omega_c t)$. Thus, the complex envelope is $$\tilde{g}_R(t) = e^{-j\omega_c \tau_i} e^{j\omega_d(t-\tau_i)} \sum_{n=0}^{N-1} \tilde{g}(t - \tau_i - nT_r) \quad (8)$$

The factor $e^{-j\omega_c \tau_i}$ in Equation (8) represents an initial constant phase shift $\phi$ of the echo that is, in general, unknown. We therefore treat that phase as a random variable with a uniform probability density function over the interval $(0, 2\pi)$. This is the least favorable distribution. We set $$\phi = -\omega_c \tau_i \quad (9)$$

Figure 6A:
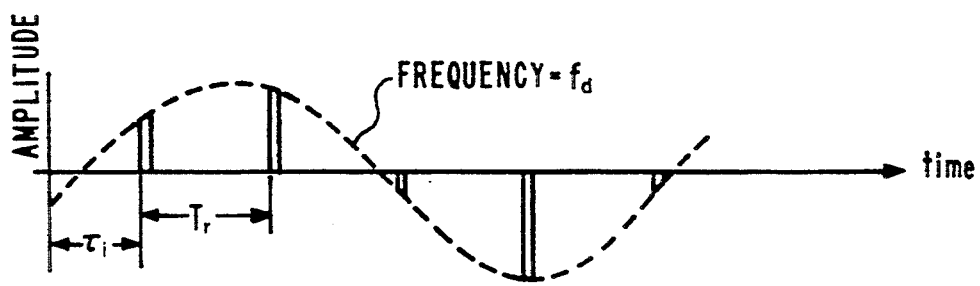
FIGS. 6a and 6b represent I and Q components, respectively, of Doppler modulation of a pulse train.
Figure 6B:
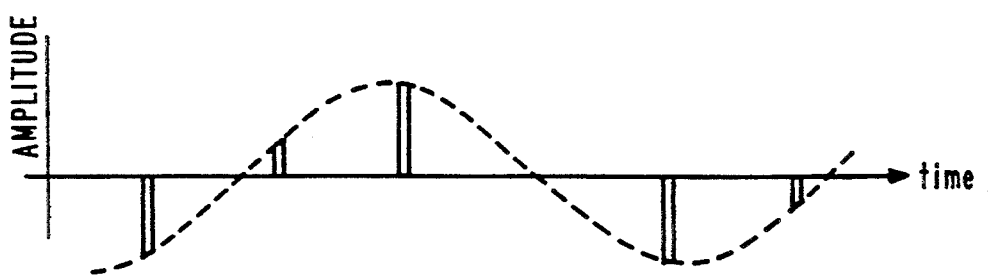

The factor $e^{j\omega_d(t-\tau_i)}$ in Equation (8) is the Doppler modulation upon the sequence of echoes. The inphase (I) and Q components of a Doppler modulated pulse train are illustrated in FIGS. 6a and 6b, respectively, where the frequency $f_d$ of the modulation envelopes 610 and 612 are the Doppler frequency, and $T_r$ is the pulse repetition period. Now we may write Equation (8) as $$\tilde{g}_R(t) = \tilde{g}_1(t)e^{j\phi} \quad (10)$$

where $$\tilde{g}_1(t) = e^{j\omega_d(t-\tau_i)} \sum_{n=0}^{N-1} \tilde{g}(t - \tau_i - nT_r) \quad (11)$$

In many cases, the pulse duration is a small fraction of the Doppler period $1/f_d$. Thus, over a pulse duration, $\exp(j\omega_d[t-\tau_i])$ is nearly a constant whose value at the $n^{th}$ pulse is obtained by setting t to $\tau_i + nT_r$, so $$\exp(j\omega_d[t-\tau_i])_{t=\tau_i+nT_r} = \exp(j\omega_d nT_r) \quad (12)$$

Thus, we may write Equation (11) as $$\tilde{g}_1(t) = \sum_{n=0}^{N-1} \tilde{g}(t - \tau_i - nT_r) e^{j\omega_d n T_r} \quad (13)$$

However, in our case, the pulse duration may be a significant fraction of the Doppler period $1/f_d$, and we can no longer consider $\exp(j\omega_d[t-\tau_i])$ to be nearly a constant. Then there will be significant Doppler phase shift during te pulse duration. To make this evident, let us set $$t = t' + \tau_i + nT_r \quad (14)$$

where t' is the time along the duration of each pulse; i.e., along the range dimension, measured from the leading edge of the $n^{th}$ received pulse. With this change Equation (13) becomes $$\tilde{g}_1(t) = e^{j\omega_d t'} \sum_{n=0}^{N-1} \tilde{g}(t')e^{jn\omega_d T_r} = e^{j\omega_d t'} \tilde{g}(t') \sum_{n=0}^{N-1} e^{jn\omega_d T_r} \quad (15)$$

Equation (15) shows that the echo complex envelope consists of the product of two parts:
1. A part $e^{j\omega_d t'}g(t')$ characterizing variation along a range trace.
2. A part $$\sum_{n=0}^{N-1} e^{jn\omega_d T_r}$$

characterizing pulse-to-pulse variation. Any signal processing to be performed can therefore be divided into a per pulse operation (i.e., along a range trace) and a pulse-to-pulse operation. It is clear that these may be done in either order.

THE PULSE-TO-PULSE OPERATION

Equation (15) expresses a sequence of received Doppler shifted envelopes $y_n$ such that $$y_n = e^{j\omega_d t'}g(t')e^{jn\omega_d T_r}, \quad n = 0, 1, \ldots, N-1 \quad (16)$$

Figure 7:
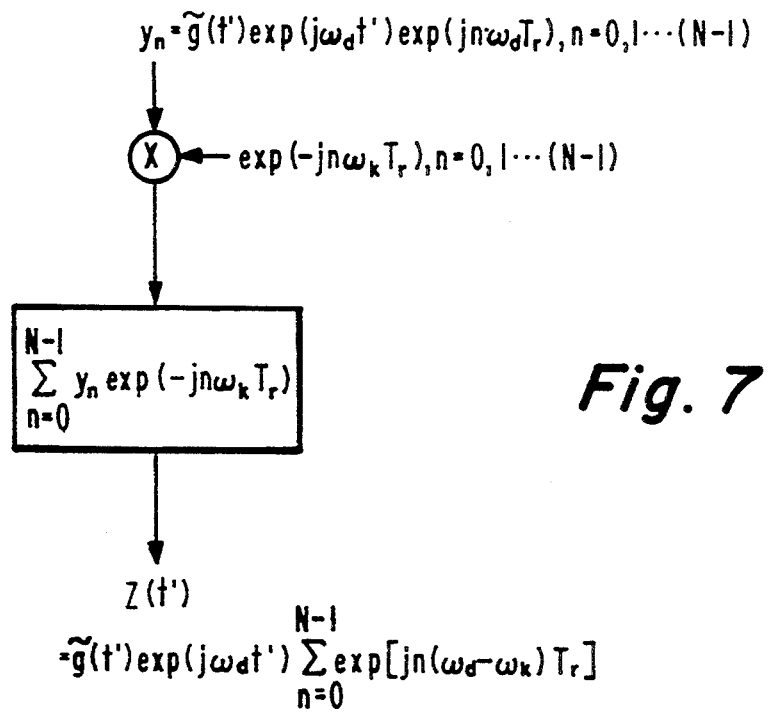
FIG. 7 is a simplified representation of pulse-to-pulse Doppler filtering arrangement.

The pulse-to-pulse operation is a Doppler filtering as ordinarily considered, illustrated in FIG. 7. The sequence of complex envelopes $y_n$, given by Equation (16), is multiplied by a sequence of complex exponentials and summed. The output, labeled z(t'), is given by $$z(t') = \bar{g}(t')\exp(j\omega_d t') \sum_{n=0}^{N-1} \exp[jn(\omega_d - \omega_k)T_r] \quad (17)$$

where $\omega_k = 2\pi f_k$

Note that the summation in z(t') is simply a constant as far as t', time along the range dimension, is concerned. If digital processing is used, $t' = r\tau_o$, where $\tau_o$ is the range sampling period.

Figure 8:
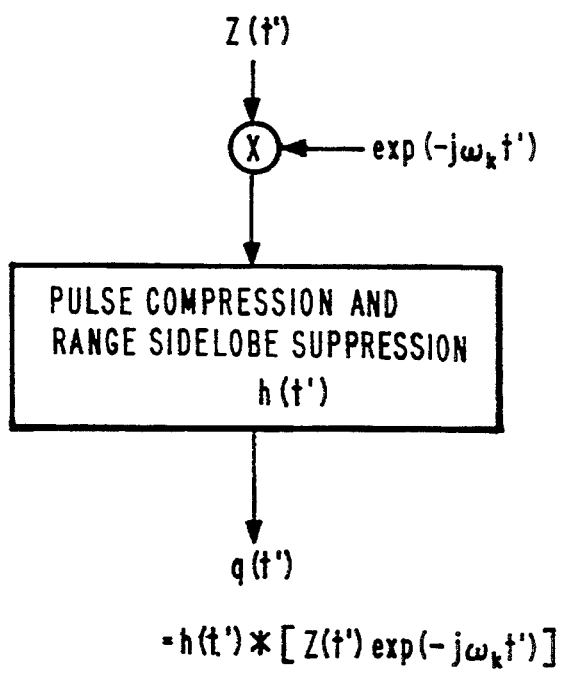
FIG. 8 is a simplified representation of pulse compression and range sidelobe suppression arrangement.

The next step in pulse-to-pulse processing is to mix z(t') from FIG. 7 with an exponential wave having the frequency $2\pi f_k = \omega_k$ and to follow this mixing operation by the filtering operation h(t'), along the range dimension t', that performs pulse compression and range sidelobe suppression. The mixing and filtering are illustrated in FIG. 8. The result of the convolution indicated by the centered * in FIG. 8 is $$q(t') = [h(t') * g(t')e^{j(\omega_d - \omega_k)t'}] \sum_{n=0}^{N-1} \exp[jn(\omega_d - \omega_k)T_r] \quad (18)$$

Interchange of the Operations

Figure 9:
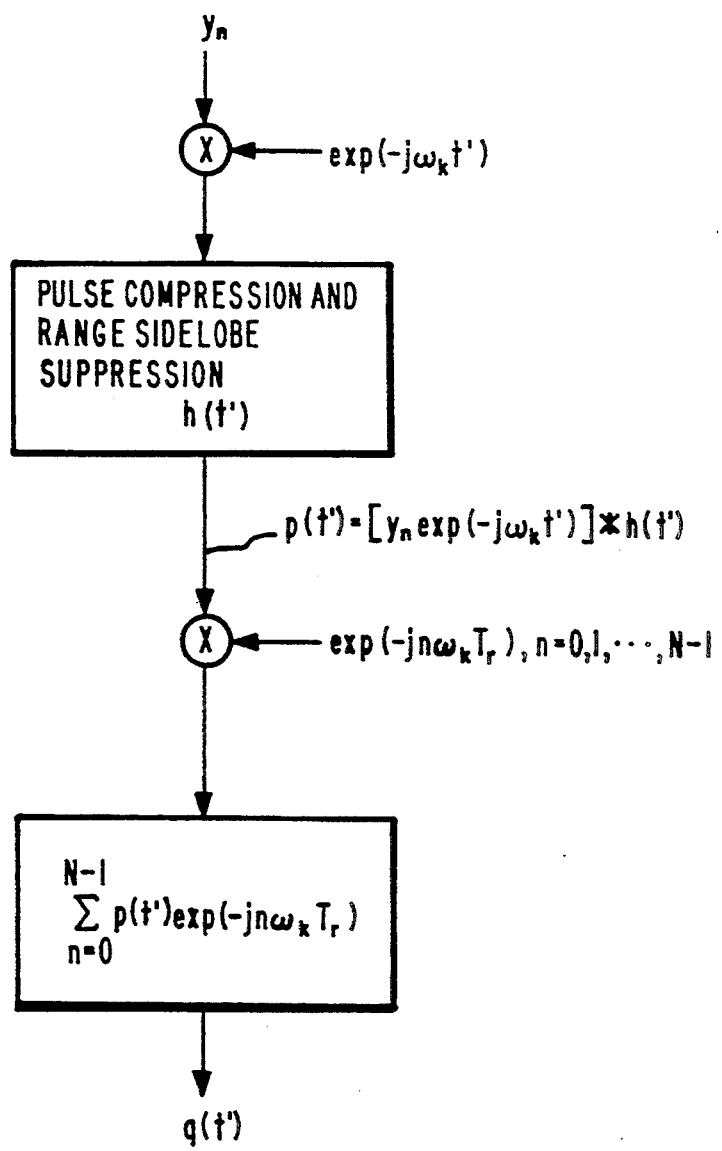
FIG. 9 is a simplified representation of a cascade of pulse compression and range sidelobe suppression followed by pulse-to-pulse Doppler filtering.

Now we look at an interchange of the operations illustrated in FIGS. 7 and 8. This interchange is shown in FIG. 9. the operation of pulse compression and range sidelobe suppression precedes the pulse to pulse Doppler filtering, reversing the cascade operation of FIGS. 7 and 8. Using Equation (16) for $y_n$, the output of the first filter of FIG. 9 can be written as $$p(t') = [y_n \exp(-j\omega_k t')] * h(t') = [\{\bar{g}(t') \exp [j(\omega_d - \omega_k)t']\} * h(t')] \exp(jn\omega_d T_r), n = 0, 1, \ldots, N-1 \quad (19)$$

The second operation is the pulse to pulse mixing and filtering yielding $$\sum_{n=0}^{N-1} p(t')\exp(-jn\omega_k T_r) = \quad (20)$$

$$[\{g(t')\exp[j(\omega_d - \omega_k)t']\} * h(t')] \sum_{n=0}^{N-1} \exp[jn(\omega_d - \omega_k)T_r]$$

Figure 1:
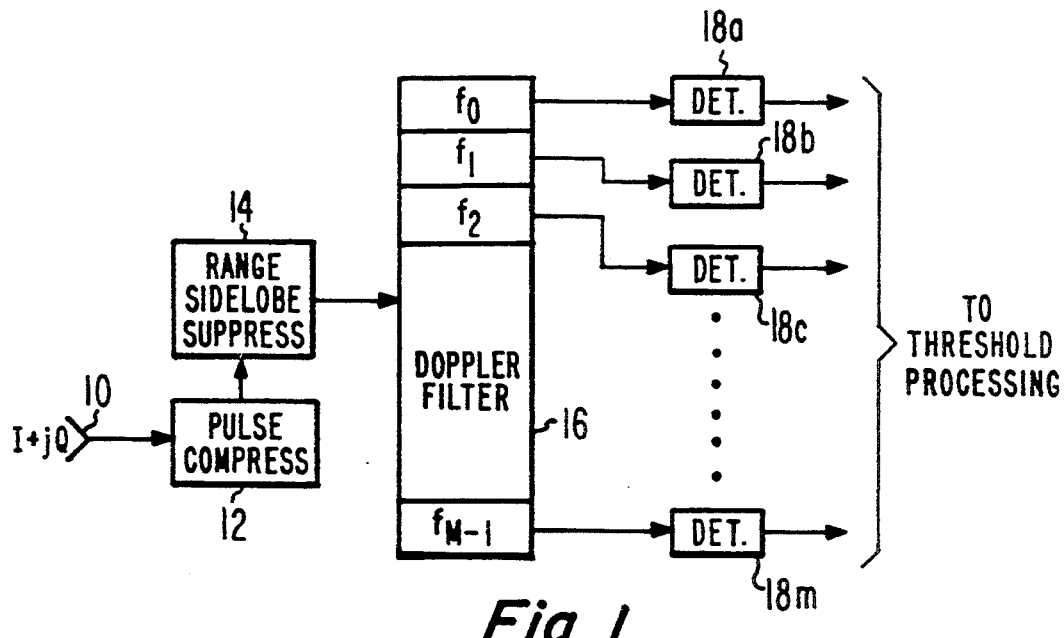
FIG. 1 is a simplified block diagram of a portion of a prior art processor including pulse compressor, range sidelobe suppressor, and Doppler filter.
Figure 2:
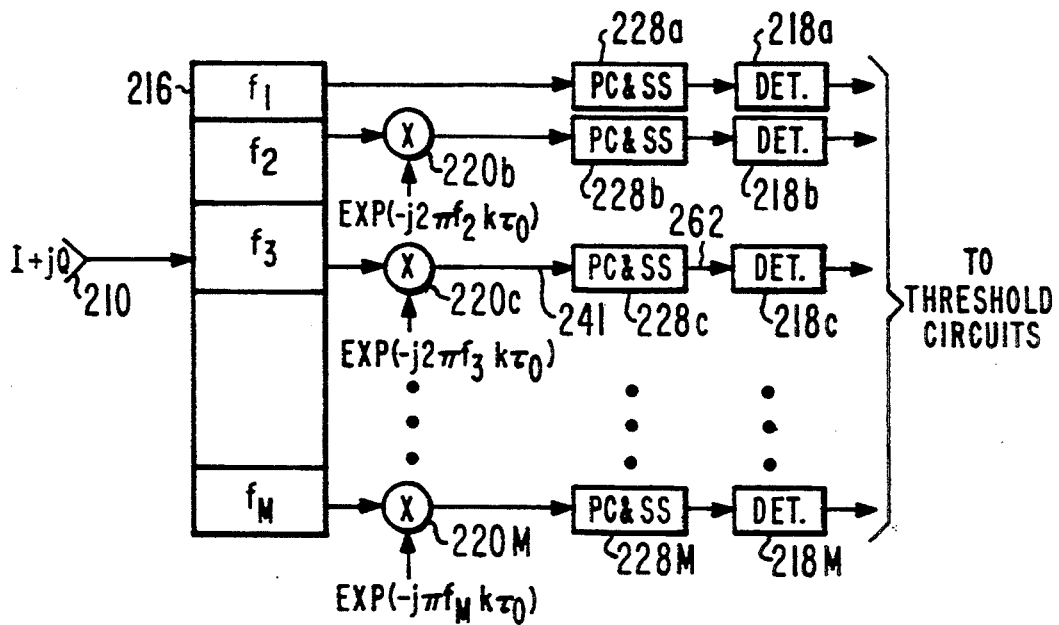
FIG. 2 is a simplified block diagram of another prior art processor for producing Doppler tolerant range sidelobe suppression.

This is q(t') of Equation (18). This establishes the equivalence of FIG. 9 with the cascade of FIGS. 7 and 8 and, therefore, the equivalence of the arrangements of FIGS. 2 and 4 when we set $t' = r\tau_0$, where $\tau_0$ is the range sampling period and r is an integer index.

Other embodiments of the invention will be apparent to those skilled in the art. For example, analog or digital processing may be used for any of the operations. The described processing may be used for sonar as well as for radar. In a radar context, different carrier frequencies may be used, and the antennas may be conventional reflector types of arrays, either passive or active, and may provide monopulse functions, nulls for jamming, and the like.

What is claimed is:

1. A Doppler radar system, comprising:
   transmitting means for transmitting a plurality of sets of dispersed pulses of electromagnetic radiation toward scatterers to generate returns;
   receiving means coupled for receiving said returns from said scatterers and for generating sets of received complex envelope signals therefrom;
   a bank of pulse-to-pulse Doppler filtering means including a second plurality of inputs and said second plurality of outputs, for filtering signals applied to each of said inputs about the center frequency of one of a plurality of frequency bins, to thereby produce a plurality of signals, each having a frequency spectrum related to that of the associated bin;
   a plurality, equal to said second plurality, of complex exponential signal generating means, each of which generates a complex exponential signal, the frequency of which is centered at the negative of the frequency of an associated one of said frequency bins;
   a plurality, equal to said second plurality, of multiplying means, each of which is coupled to said receiving means and to one of said complex exponential signal generating means, each of said multiplying means being for multiplying said sets of received complex envelope signals by one of said complex exponential waveforms, to thereby convert said sets of received signals into a baseband signal component at the output of said multiplying means, whereby said plurality of multiplying means produces a plurality of baseband signal components;
   a plurality, equal in number to said second plurality, of identical cascades, each of said cascades including the cascade of range sidelobe suppression means and pulse compression means, each of said cascades being coupled to the output of one of said and to said input of a corresponding one of said pulse-to-pulse Doppler filter means of said Doppler filter bank, each of said cascades being for processing one of said baseband signal components to reduce range sidelobes, to thereby produce a plurality of range sidelobe suppressed signals at said inputs of said pulse-to-pulse Doppler filter means, whereby each set of transmitted and received signals results in a set of signals at the outputs of said Doppler filter bank.

2. A system according to claim 1, wherein said range sidelobe suppression means comprises a FIR filter.

3. A system according to claim 1, wherein each of said complex exponential signal processing means comprises an oscillator.

4. A method for detecting a target by radar, comprising the steps of:
   transmitting dispersed pulses of electromagnetic radiation toward the target;
   receiving echo pulses from the target, and generating complex envelope of received signals in response to the echo pulses;
   multiplying said complex envelope by a plurality of complex exponential waveforms which are selected to convert said complex envelope into said plurality of baseband signal components;
   pulse compressing and range sidelobe suppressing each of said plurality of baseband signals, to thereby produce processed baseband signals in which the range sidelobe suppression may be degraded; and
   pulse-to-pulse Doppler filtering said processed baseband signals to produce a plurality of baseband signal components in which said range sidelobe suppression is improved.

5. A method according to claim 4, wherein said step of pulse compressing comprises the step of compressing the duration of said echo pulses.

6. A method according to claim 4, wherein said pulse compressing step is performed before said step of suppressing range sidelobes.

7. A method according to claim 4, wherein said compressing step is performed after said step of suppressing range sidelobes.

* * * * *